United States Patent
Pedersen et al.

(10) Patent No.: US 9,179,224 B2
(45) Date of Patent: Nov. 3, 2015

(54) HEARING DEVICE WITH ADAPTIVE FEEDBACK-PATH ESTIMATION

(71) Applicant: Oticon A/S, Smørum (DK)

(72) Inventors: Michael Syskind Pedersen, Smørum (DK); Jesper Jensen, Smørum (DK); Meng Guo, Smørum (DK)

(73) Assignee: OTICON A/S, Smorum (DK)

( * ) Notice: Subject to any disclaimer, the term of this patent is extended or adjusted under 35 U.S.C. 154(b) by 0 days.

(21) Appl. No.: 14/542,067

(22) Filed: Nov. 14, 2014

(65) Prior Publication Data

US 2015/0139460 A1 May 21, 2015

(30) Foreign Application Priority Data

Nov. 15, 2013 (EP) .................................. 13193053

(51) Int. Cl.
*H04R 25/00* (2006.01)
*H04R 3/00* (2006.01)
*H04M 1/20* (2006.01)
*H04M 9/08* (2006.01)

(52) U.S. Cl.
CPC ............. *H04R 25/453* (2013.01); *H04R 3/002* (2013.01); *H04M 1/20* (2013.01); *H04M 9/082* (2013.01); *H04R 25/552* (2013.01); *H04R 25/554* (2013.01); *H04R 25/558* (2013.01); *H04R 25/70* (2013.01); *H04R 2225/55* (2013.01); *H04R 2430/03* (2013.01)

(58) Field of Classification Search
CPC ...... H04R 3/002; H04R 25/353; H04R 25/45; H04R 25/453; H04R 25/505; H04R 25/552; H04R 2225/55; H04R 2430/03; H04M 1/20
USPC ................ 381/23.1, 312, 317, 318, 320, 321, 381/71.11, 71.12, 83, 93, 94.1, 94.2
See application file for complete search history.

(56) References Cited

U.S. PATENT DOCUMENTS

| | | | | |
|---|---|---|---|---|
| 6,898,293 | B2* | 5/2005 | Kaulberg | ...................... 381/318 |
| 8,442,251 | B2* | 5/2013 | Jensen et al. | .................. 381/318 |
| 8,571,243 | B2* | 10/2013 | Komagel et al. | .............. 381/317 |

FOREIGN PATENT DOCUMENTS

| | | | |
|---|---|---|---|
| EP | 2 237 573 | A1 | 10/2010 |
| EP | 2 613 566 | A1 | 7/2013 |
| WO | WO 01/22775 | A2 | 3/2001 |
| WO | WO 2010/112073 | A1 | 10/2010 |

OTHER PUBLICATIONS

Park et al., "An Efficient Feedback Cancellation for Multiband Compression Hearing Aids", Proceedings of the 20th Annual International Conference of the IEEE Engineering in Medicine and Biology Society, Oct. 29, 1998, vol. 20, No. 5, pp. 2706-2709.

* cited by examiner

*Primary Examiner* — Huyen D Le
(74) *Attorney, Agent, or Firm* — Birch, Stewart, Kolasch & Birch, LLP

(57) ABSTRACT

A hearing device comprises a feedback-path estimation unit, which adaptively estimates a feedback path from an output transducer to an input transducer, and sets an adaptation-step size of an adaptive feedback-path estimation algorithm in dependence on an estimate of a background-noise spectrum. The feedback-path estimation unit provides an estimation-control signal for generating an acoustic feedback-path estimation signal having an level spectrum, which has at least one first frequency band with non-zero level and at least one second frequency band with zero level or with a non-zero level smaller than the level in the first frequency band and smaller than a background-noise level in the respective second frequency band. Background noise is detected in the second frequency band while the feedback-path estimation signal is provided. The background-noise level in the at least one first frequency band is estimated for obtaining the estimate of the background-noise spectrum. A corresponding method is described. The method is e.g. useful for estimating a feedback path during fitting of a hearing device, e.g. a hearing aid, to a particular user's needs.

19 Claims, 7 Drawing Sheets

HEARING DEVICE WITH ADAPTIVE FEEDBACK-PATH ESTIMATION

The present invention relates to a hearing device adapted for being located in or at (or partially implanted in the head at) an ear of a user. It is further concerned with a method for operating such a hearing device.

The document WO 2010/112073 A1 discloses a hearing device providing an adaptive feedback cancellation. Feedback cancellation is based on an estimation of a feedback-path from an output transducer to an input transducer of the hearing device. Adaptive feedback-path estimation algorithms known from WO 2010/112073 A1 include a control of a step-size of adaptation of the feedback-path estimation algorithm. The step-size control influences a speed, at which the adaptive feedback-path estimation algorithm converges (or diverges). EP 2613566 A1 relates to a method of detecting whether an ear mould of a listening device is correctly mounted in the ear of a user. A special current feedback path estimate is based on an open loop estimation where a probe signal is played by a loudspeaker of the listening device and the resulting current feedback path is estimated by an adaptive algorithm (e.g. an adaptive algorithm of a feedback estimation unit). In an embodiment, the probe signal is applied in a particular mode of the listening device, e.g. as part of a start-up procedure, or at the request of a user or a caring person, or an audiologist (e.g. during fitting), e.g. via a user or programming interface, e.g. a remote control.

Generally, the measurement of feedback-paths (e.g. during fitting and/or during upstart of a hearing device and/or at other times) is perceived as uncomfortable by the listener, i.e. the user wearing the hearing device, who is exposed to a feedback-measurement sound sequence in the course of the measurement.

One way to estimate the feedback path is by an adaptive algorithm possibly implemented in different frequency sub-bands. The performance of the algorithm will depend on the level of the background noise. It is thus an advantage, if the background level can be well estimated.

Knowledge of the time-variant background noise level in different frequency bands can be used to optimize the adaptation rate, e.g. a frequency-dependent adaptation rate parameter (e.g. a step size µ or a forgetting factor λ), of the adaptive algorithm.

In accordance with a first aspect of the present invention, a hearing device adapted for being located in or at an ear of a user is provided. The hearing device comprises:
an input transducer, which is configured to detect and convert an acoustic input signal to an electric input signal;
an output transducer, which is configured to receive and convert an electric output signal to an acoustic or vibrational output signal;
a feedback-path estimation unit, which is configured to estimate a feedback path from the output transducer to the input transducer by performing an adaptive feedback-path estimation algorithm and to set an adaptation rate parameter (e.g. a step size) of the adaptive feedback-path estimation algorithm in dependence on an estimate of a background-noise spectrum, to which the input transducer is exposed. The feedback-path estimation unit is further configured
a) to provide to the output transducer an electric estimation-control signal for generating an acoustic feedback-path estimation signal having an level spectrum, which has at least one first frequency band with non-zero level and at least one second frequency band with zero level or with a non-zero level smaller than the level in the first frequency bands and smaller than a previously determined background-noise level in the respective second frequency band;
b) to control the input transducer to detect background noise in the at least one second frequency band while the feedback-path estimation signal is provided; and
c) to estimate a background-noise level in the at least one first frequency band for obtaining the estimate of the background-noise spectrum.

In an embodiment, the background-noise level in the at least one first frequency band is based on (or influenced by) the detected background-noise level in the at least one second frequency band. In an embodiment, the background-noise level in the at least one first frequency band is (additionally or alternatively) based on (or influenced by) a received estimated background-noise level in the at least one first frequency band (the estimate being e.g. received from another hearing device of a binaural hearing device system).

The hearing device of the first aspect of the present invention allows performing an acoustic feedback-path estimation based on an acoustic feedback-path estimating signal extending substantially only in the first frequency band(s), while the second frequency band(s) is/are used for detecting background noise during the time span, in which the feedback-path estimation signal is provided. The hearing device thus allows measuring background noise in the at least one second frequency band at the same time as the acoustic feedback-path estimation signal is provided for determining the feedback-path in the at least one first frequency band. On the basis of the acquired knowledge of the typically time-variant background-noise level in the at least one second frequency band, an estimate of the background-noise spectrum is determined. Thus, information about the feedback path and the background-noise spectrum can be obtained in parallel. The step size (or equivalent) of the adaptive feedback-path estimation algorithm can be adapted quickly during the adaptation process, which in turn allows a faster convergence of the adaptive algorithm. This finally allows providing the acoustic feedback-path estimation signal over a particularly short time span, thus providing a relief for the user.

The term 'electric estimation-control signal for generating an acoustic feedback-path estimation signal' is in the present context used for a probe signal particularly configured to be used by an adaptive algorithm to estimate a feedback path (e.g. to estimate an impulse response or a transfer function of the feedback path).

In the following, further embodiments of the hearing device of the first aspect of the present invention will be described.

In an embodiment, the part of the the input transducer that is adapted to detect background noise in the at least one second frequency band while the feedback-path estimation signal is provided is located in another part of (physically separate from) the hearing device (or device, e.g. in an auxiliary device, e.g. a SmartPhone) than the output transducer.

In an embodiment, the hearing device comprises a level detector for determining the level of an input signal (e.g. on a band level and/or of the full (wide band) signal). In an embodiment, a level detector is coupled to the output of the input transducer to estimate a level/levels of the electric input signal. This can e.g. be used to estimate a current noise level based on the particular acoustic estimation-control signal according to the present disclosure as received by the input transducer of the hearing device after having propagated through the acoustic feedback path from output to input transducer.

In an embodiment, the (or each) hearing device comprise(s) a TF-conversion unit for providing a time-frequency representation of an input signal, e.g. an analysis filterbank. In an embodiment, the time-frequency representation comprises an array or map of corresponding complex or real values of the signal in question in a particular time and frequency range. In an embodiment, the TF conversion unit comprises a filter bank for filtering a (time varying) input signal and providing a number of (time varying) output signals each comprising a distinct frequency range of the input signal. In an embodiment, the TF conversion unit comprises a Fourier transformation unit (e.g. based on a DFT-, e.g. an FFT-algorithm) for converting a time variant input signal to a (time variant) signal in the frequency domain. Correspondingly, the (or each) hearing device may comprise(s) a time-frequency to time conversion unit for providing a time-domain representation of a signal from a frequency domain signal, e.g. a synthesis filterbank or an inverse Fourier transformation unit.

In embodiments that are particularly suited for operation in a binaural system, the hearing device further comprises a link unit, which is configured to exchange, in a binaural operation mode of the hearing device, signals with an external link unit of a second hearing device that together with the hearing device forms a binaural hearing system.

Here, use can be made of information (e.g. level information) on the background-noise in the first frequency band, if the external other hearing device of the binaural system has such information. In such embodiments, the link unit is therefore configured to receive from the external link unit and provide to the feedback-path estimation unit noise-estimation signals representing background-noise levels in at least one of the (plurality of) first frequency bands. The feedback-path estimation unit is configured to estimate the background-noise levels in the corresponding at least one of the (plurality of) first frequency bands using the received noise-estimation signals. In one variant of this embodiment, the feedback-path estimation unit is configured to apply a scaling to the received background-noise levels in order to fit the background-noise levels in to the sections of the background-noise spectrum detected in the second frequency bands.

While many modern hearing devices are provided in the form of binaural systems, this may not necessarily be suitable for all users requiring a hearing device. Therefore, embodiments of the hearing device provide a feedback-path estimation unit that is configured to estimate the background-noise level in at least one of the first frequency bands using an level of the background-noise detected in the at least one respective second frequency band immediately adjacent to the respective first frequency band. In one variant of this embodiment, the frequency-dependent background-noise level in the respective first frequency band is estimated by forming an interpolation between background-noise levels determined in respective adjacent second frequency bands. In a variant, there is only one adjacent second frequency band, in which the background-noise has been detected, an extrapolation may be used instead of interpolation.

In an embodiment, the acoustic feedback-path estimation signal has an level spectrum, which comprises a plurality of first frequency bands. In an embodiment, the acoustic feedback-path estimation signal has an level spectrum, which comprises a plurality of second frequency bands.

Different configurations of the first and second frequency bands may be employed in different embodiments. In an embodiment, the configuration of the first and second frequency bands is fixed over time (the term 'configuration' being in this context taken to mean the location of the border frequencies between adjacent frequency bands). In an embodiment, the first and second frequency bands are distinctly different (have no substantial overlap). Alternatively, the first and second frequency bands overlap. The differentiation between the first and second frequency bands need, however, not be fixed over time. In some embodiments, a border between neighboring first and second frequency bands is a time-dependent frequency value, at which a non-zero level of the acoustic feedback-path estimation signal is just low enough to allow a distinction and technical separation of the background noise from the feedback-path estimation signal. It is therefore sufficient to provide an acoustic feedback-path estimation signal that—without prior knowledge or determination of defined border frequencies between first and second frequency band—has frequency bands, which have an level lower than the level in the first frequency bands and in the measurement process turn out to allow a distinction and separation of the background noise from the feedback-path estimation signal. This can be achieved by an acoustic feedback estimation signal that has edges reaching zero level in at least one frequency band.

In embodiments, the configuration of the first and second frequency bands is variable as a function of time, depending on the time-varying background-noise level spectrum. However, the configuration of first and second frequency bands may, alternatively or additionally, be varied deliberately.

A variation of the level spectrum of the feedback-path estimation signal, i.e., any variation of its level at any frequency, is in one embodiment controlled in response to detecting predefined conditions of the detected background-noise spectrum, or in response to detecting predefined conditions in the convergence of the feedback-path estimation algorithm.

Preferably, in the configuration of first and second frequency bands, the at least one first frequency band is arranged between two adjacent, i.e. immediately neighboring, second frequency bands. This configuration allows an interpolation of the background-noise spectrum in the first frequency band based on measured background-noise values (of the second frequency bands) at lower and at higher frequencies, which often achieves a higher accuracy of background-noise estimation than other types of estimation, such as extrapolation.

Further preferred configurations of the first and second frequency bands correspond to an acoustic feedback-path estimation signal with an level spectrum that comprises an alternating sequence of a plurality of first frequency bands and a plurality of second frequency bands. In these configurations, at least two first frequency bands and at least two second frequency bands are present. In preferred embodiments, the number of first and second frequency bands is larger than two each. Some embodiments have at least 5 first and second frequency bands each, other embodiments have at least 10 first and second embodiments each, other embodiments have at least 50 first and second frequency bands each. The number of first and second frequency bands influences the accuracy that can be achieved in the estimation of the background noise in the first frequency bands. However, a large number of first and second frequency bands requires a higher processing expenditure in the estimation of the background-noise spectrum in the first frequency bands. Therefore, the configuration to be used should be selected with respect to the processing capacity of the hearing device, in particular the feedback-path estimation unit.

In preferred embodiments, the first and second frequency bands have no spectral overlap with each other. This avoids detecting the feedback-path measurement signal as a part of the background noise, which makes the signal processing easier.

It may be acceptable to have a non-zero level of the acoustic feedback-estimation signal in the second frequency bands in certain circumstances, namely, if it does not substantially disturb the detection of background noise in the second frequency bands. This may be possible, if the level of the acoustic feedback-estimation signal in the respective second frequency band is smaller than in the first frequency bands and, most importantly, at the same time smaller than the background-noise level in the respective second frequency band. The current background-noise level in the respective second frequency band may be estimated using a background-noise level in this respective second frequency band. Signal processing techniques based on the knowledge of the generated acoustic feedback-estimation signal can be used to distinguish the background-noise signal from the acoustic feedback-estimation signal such configurations in such configurations.

The level spectrum of the acoustic feedback-path estimation signal preferably has exactly or at least approximately vertical edges between the first and second frequency bands. Preferably also, in the first frequency bands, there is a flat region within the respective first frequency band, in which the level of the acoustic feedback-path estimation signal has the same value at different frequencies. In an embodiment, the border frequencies between adjacent (first and second) frequency bands are determined by 3 dB cut off frequencies of the magnitude transfer functions of the filters (e.g. digital filters) used to implement the frequency bands, e.g. a filter-bank or a number of bandpass and bandstop filters.

Preferred embodiments of the hearing device comprise a signal processor, which is connected with the feedback-estimation unit, the input transducer and the output transducer, and which is configured to apply an adaptable transfer function to the electric input signal or a signal derived therefrom and to provide a filtered electric output signal.

In one embodiment, the feedback-path estimation unit comprises the following sub-units:
- a feedback-path estimator, which is configured to perform (i.e. carry out or execute) an adaptive feedback-path estimation algorithm, whose convergence speed is controlled using a controllable value of an adaptation-rate parameter (e.g. step size);
- a control unit, which is configured to start a feedback-estimation operation and to set the adaptable adaptation rate parameter (e.g. step-size) in dependence on the estimate of the background-noise spectrum;
- a probe-signal generator, which is configured to generate and provide to the output transducer an electric estimation-control signal comprising a spectral configuration defining the first and second frequency bands of the acoustic feedback-path estimation signal to be generated by the output transducer; and
- a background-noise estimator, which is configured to receive from the input transducer measured background-noise spectrum information (e.g. level) regarding the second frequency bands and to estimate background-noise spectrum information (e.g. level) regarding the first frequency bands.

In an embodiment, the feedback-path estimator is based on a linear time invariant filter to estimate the feedback path where its filter weights are updated over time. The filter update may be calculated using stochastic gradient algorithms, including e.g. the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal. The filter update may use other adaptive algorithms like the Recursive Least Squares (RLS) algorithm or be based on Kalman filtering. Various aspects of adaptive filters are e.g. described in [Haykin] (S. Haykin, Adaptive filter theory (Fourth Edition), Prentice Hall, 2001). In an embodiment, the adaptation rate parameter is a step size $\mu$ or a forgetting factor $\lambda$ of the adaptive algorithm. In an embodiment the step size p or a forgetting factor $\lambda$ is frequency dependent ($\mu(f)$, $\lambda(f)$, f being frequency).

In various embodiments, the probe signal comprises band pass filtered white noise, pure tones, sine sweeps, pseudo-random noise such as a Maximum Length Sequence (MLS) sequence or frequency modulated sine tones.

Preferably, the hearing device (e.g. the control unit) is configured to initiate the feedback estimation in a particular 'basic feedback estimation mode' (e.g. during fitting or start-up of the hearing device). In an embodiment, the hearing device is configured—in a 'normal feedback estimation mode' of operation—to use the feedback estimation device to estimate a feedback from the output transducer to the input transducer based on a signal from the input transducer (instead of (or in addition to) the signal from the probe-signal generator).

In some embodiments, the feedback-estimation unit is an integral part of the signal processor. In other embodiments, the feedback-estimation unit is a separate unit. In those types of embodiments, the signal processor may be implemented as a digital signal processor (DSP). The functionality of the signal processor may be implemented in hardware or in software, or as a mix of hardware and software components.

The generation of the probe signal is in some embodiments performed by a signal generator, which is configured to generate a primary signal with non-zero level in the first and second frequency bands. The hearing device of this embodiment further comprises a signal filter, which receives the primary signal and is configured to transduce the primary estimation-control signal to the estimation-control signal by attenuating or eliminating signal components in the at least one second frequency band. In other embodiments, the feedback-path estimation unit is configured to directly synthesize the primary estimation-control signal with a frequency spectrum that corresponds to the desired frequency spectrum of the acoustic feedback-estimation signal.

Some embodiments of the hearing device have a feedback-path estimation unit, which is additionally configured to provide at its output, at a given moment in time, either the estimation-control signal or an alternative estimation-control signal having an level spectrum differing from that of the estimation-control signal (e.g. a zero signal or white noise signal or other appropriate probe signal for facilitating the feedback path estimation), and to refrain from estimating the background-noise level when the alternative feedback-path estimation signal is provided (when the hearing device is NOT in the 'basic feedback estimation mode'). This embodiment allows to change between feedback-path estimation according to the present invention and a feedback-path estimation according to the prior art (e.g. in the 'normal feedback estimation mode' of operation). In an embodiment, a probe signal (estimation-control signal) according to the present disclosure may be applied to the output transducer (possibly mix with a signal of the forward path, cf. e.g. FIG. 7A) in specific situations to make an update estimate of the feedback path, e.g. initiated by the user via a user interface. In an embodiment, the probe signal (estimation-control signal) according to the present disclosure is applied at power-up of the hearing device (possibly constituting or forming part of a start-up jingle) to provide an estimate of the feedback path, e.g. to get an indication of the proper mounting of the hearing device (e.g. for hearing devices comprising a (possibly customized) mould for fitting into the ear canal of the user) by comparison with a predefined feedback path, known to correspond to a properly mounted device.

Preferably, the feedback measurement (or the time where the probe signal is 'played') according to the present disclosure is minimized in time. Preferably, the feedback measurement is confined to take less than 30 s, such as less than 15 s, such as less than 10 s, such as less than 5 s, such as less than 1 s.

In accordance with a second aspect of the present invention, a method for operating a hearing device adapted for being located in or at an ear of a user in estimating a feedback path between an input transducer is provided, which converts an input sound to an electric input signal, and an output transducer, which converts an electric output signal to an output sound (or vibration). The method comprises:

providing, via the output transducer, an acoustic feedback-path estimation signal having an level spectrum exhibiting a at least one (e.g. a plurality of) first frequency bands having non-zero level and at least one second frequency band, which has zero level or a non-zero level smaller than the level in the first frequency band(s), and smaller than a background-noise level in the respective second frequency band;

estimating the feedback path from the output transducer to the input transducer by performing an adaptive feedback-path estimation algorithm;

detecting background noise in the at least one second frequency band while the acoustic feedback-path estimation signal is provided;

estimating a background-noise level in the at least one first frequency bands for obtaining an estimate of a background-noise spectrum to which the input transducer is exposed, based on the detected background-noise level in the at least one second frequency band and on the estimated background-noise level in the at least one first frequency band(s); and setting an adaptation rate parameter (e.g. step size) of the adaptive feedback-path estimation algorithm in dependence on the obtained estimate of the background-noise spectrum.

The method of the second aspect of the present invention shares the advantages explained for the hearing device of the first aspect of the invention. In particular, a fast convergence of the feedback-estimation algorithm is achieved due to improved information (e.g. level information) on the current background-noise spectrum achieved by the method of the present invention.

In the following, embodiments of the method are described. In one embodiment, the method further comprises estimating the background-noise level in at least one of the first frequency bands, using an level of the background noise detected in at least one respective second frequency band immediately adjacent to the respective first frequency band.

In another embodiment, the method further comprises
operating the hearing device in a binaural operation mode, and, while operating in the binaural operation mode:
exchanging signals with an external second hearing device that together with the hearing device forms a binaural hearing system,
receiving from the second hearing device noise-estimation signals representing background-noise levels in at least one of the plurality of first frequency bands, and
estimating the background-noise levels in the corresponding at least one of the plurality of first frequency bands using the received noise-estimation signals.

A preferred form of this embodiment is a method for operating a binaural hearing system of two hearing devices. The method comprises
each of the two hearing devices performing a method according to the embodiment last described;
wherein the respective first and second frequency bands are set by the two hearing devices in a complementary manner, such that respective first frequency bands of a first one of the two hearing devices coincide in frequency with respective second frequency bands of the second one of the two hearing devices.

In an embodiment, the adaptation rate parameter is step size $\mu$ or a forgetting factor $\lambda$ of the adaptive algorithm. In an embodiment the step size $\mu$ or a forgetting factor $\lambda$ is frequency dependent ($\mu(f)$, $\lambda(f)$, f being frequency). In an embodiment, the adaptation rate parameter at a given frequency $f_x$ or in a given frequency band is modified to decrease the adaptation rate (e.g. decrease $\mu(f_x)$ of $\lambda(f_x)$), if the background-noise level increases. In an embodiment, the adaptation rate parameter at a given frequency $f_x$ or in a given frequency band is modified to increase the adaptation rate (e.g. increase $\mu(f_x)$ of $\lambda(f_x)$), if the background-noise level decreases.

In the present context, a 'hearing device' refers to a device, such as e.g. a hearing instrument or an active ear-protection device or other audio processing device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. A 'hearing device' further refers to a device such as an earphone or a headset adapted to receive audio signals electronically, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear.

The hearing device may be configured to be worn in any known way, e.g. as a unit arranged behind the ear with a tube leading radiated acoustic signals into the ear canal or with a loudspeaker arranged close to or in the ear canal, as a unit entirely or partly arranged in the pinna and/or in the ear canal, as a unit attached to a fixture implanted into the skull bone, as an entirely or partly implanted unit, etc. The hearing device may comprise a single unit or several units communicating electronically with each other.

More generally, a hearing device comprises an input transducer for receiving an acoustic signal from a user's surroundings and providing a corresponding input audio signal and/or a receiver for electronically (i.e. wired or wirelessly) receiving an input audio signal, a signal processing circuit for processing the input audio signal and an output means for providing an audible signal to the user in dependence on the processed audio signal. In some hearing devices, an amplifier may constitute the signal processing circuit. In some hearing devices, the output means may comprise an output transducer, such as e.g. a loudspeaker for providing an air-borne acoustic signal or a vibrator for providing a structure-borne or liquid-borne acoustic signal.

In some hearing devices, the vibrator may be adapted to provide a structure-borne acoustic signal transcutaneously or percutaneously to the skull bone. In some hearing devices, the vibrator may be implanted in the middle ear and/or in the inner ear. In some hearing devices, the vibrator may be adapted to provide a structure-borne acoustic signal to a middle-ear bone and/or to the cochlea. In some hearing devices, the vibrator may be adapted to provide a liquid-borne acoustic signal to the cochlear liquid, e.g. through the oval window.

A 'hearing system' refers to a system comprising one or two hearing devices, and a 'binaural hearing system' refers to a system comprising one or two hearing devices and being adapted to cooperatively provide audible signals to both of the user's ears. Hearing systems or binaural haring systems may further comprise 'auxiliary devices', which communicate with the hearing devices and affect and/or benefit from the function of the hearing devices. Auxiliary devices may be e.g. remote controls, audio gateway devices, mobile phones (e.g. SmartPhones), public-address systems, car audio systems or music players. Hearing devices, hearing systems or binaural hearing systems may e.g. be used for compensating for a hearing-impaired person's loss of hearing capability, augmenting or protecting a normal-hearing person's hearing capability and/or conveying electronic audio signals to a person.

As used herein, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element or intervening elements may be present, unless expressly stated otherwise. Furthermore, "connected" or "coupled" as used herein may include wirelessly connected or coupled. As used herein, the term "and/or" includes any and all combinations of one or more of the associated listed items. The steps of any method disclosed herein do not have to be performed in the exact order disclosed, unless expressly stated otherwise.

In the following, further embodiments of the different aspects of the present invention will be described with reference to the enclosed drawings.

Figure 1:
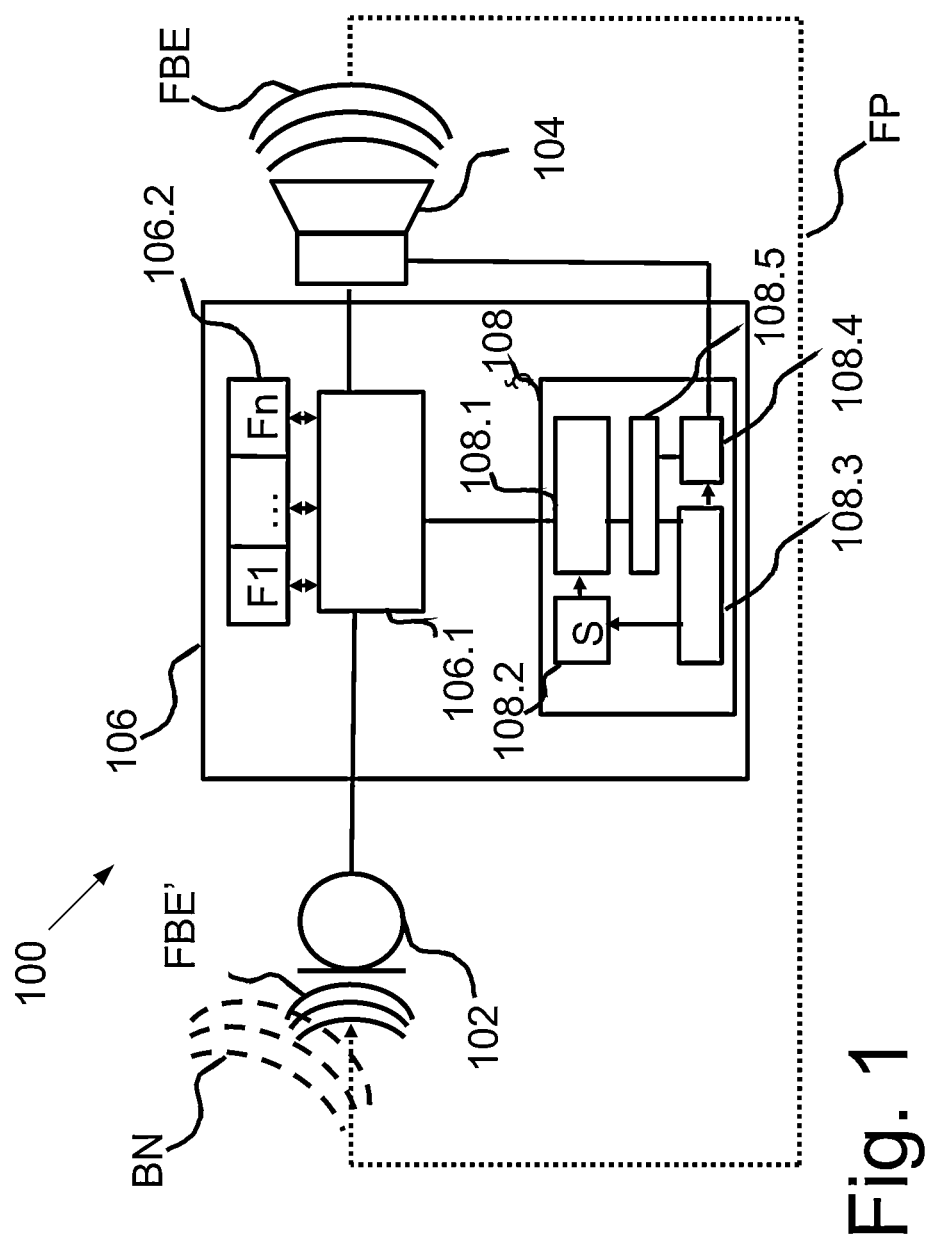
FIG. 1 shows a schematic block diagram of an embodiment of a hearing device.
Figure 5:
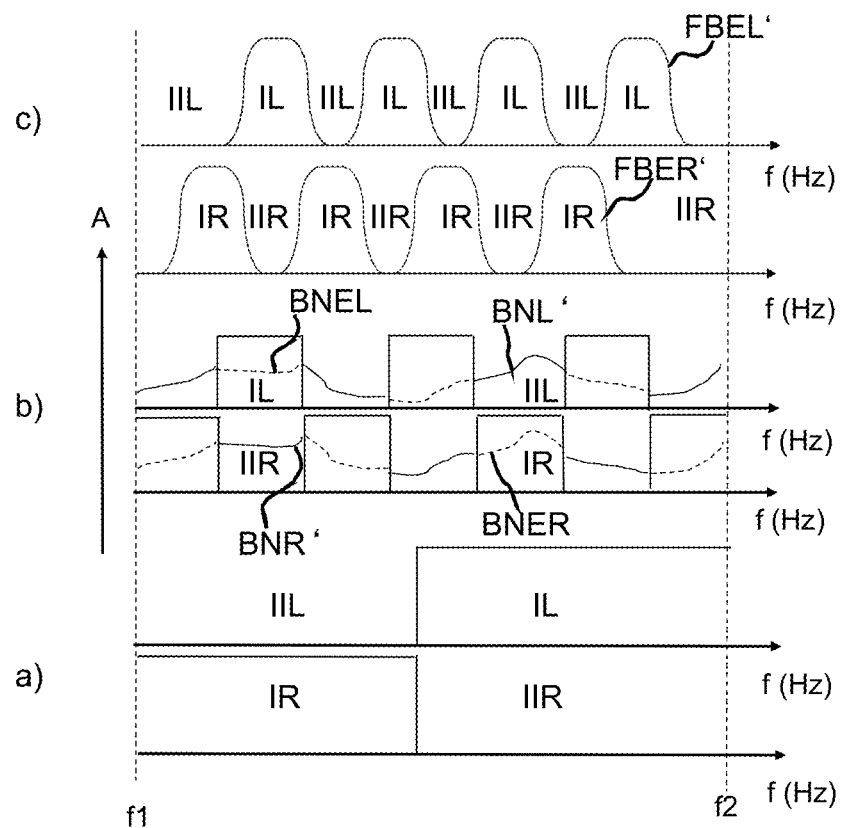
Figure 6A:
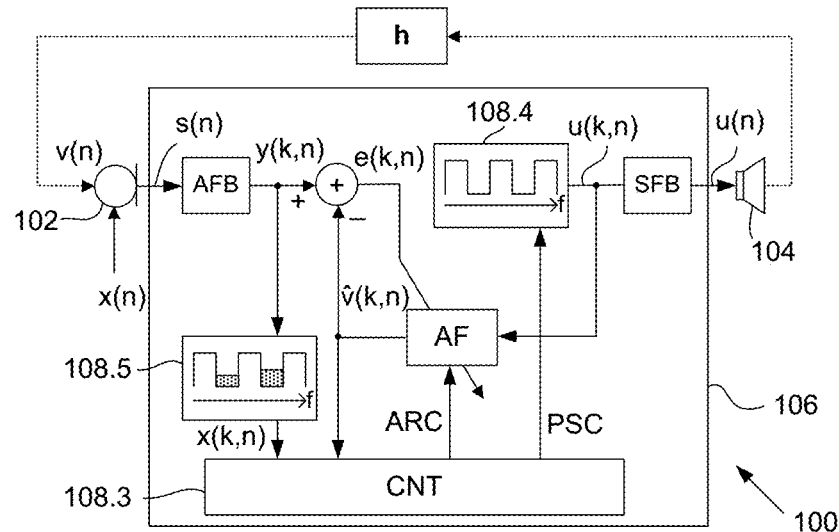
Figure 6B:
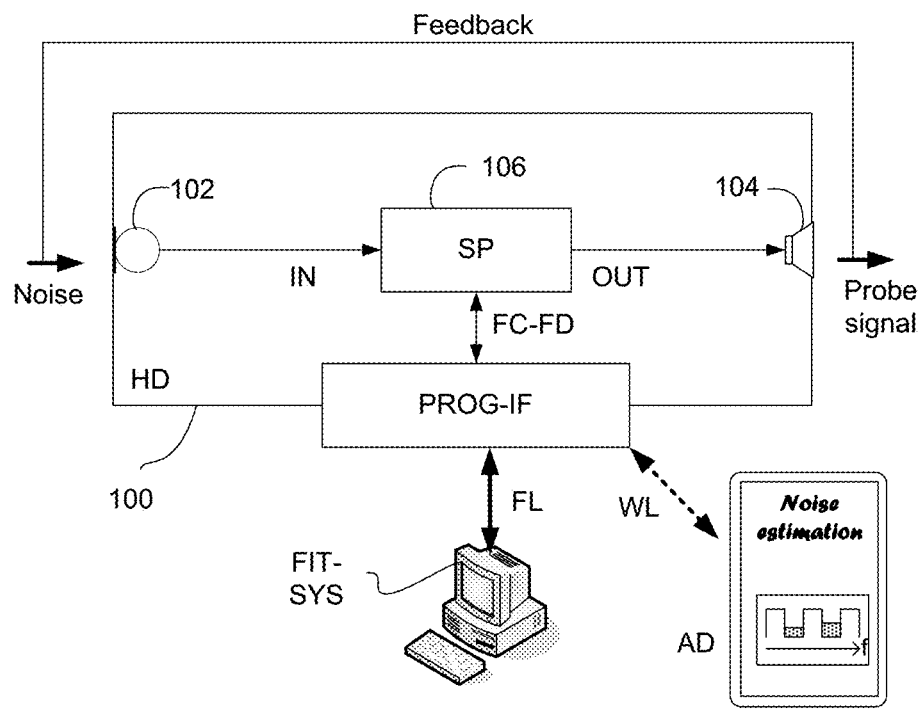
Figure 7A:
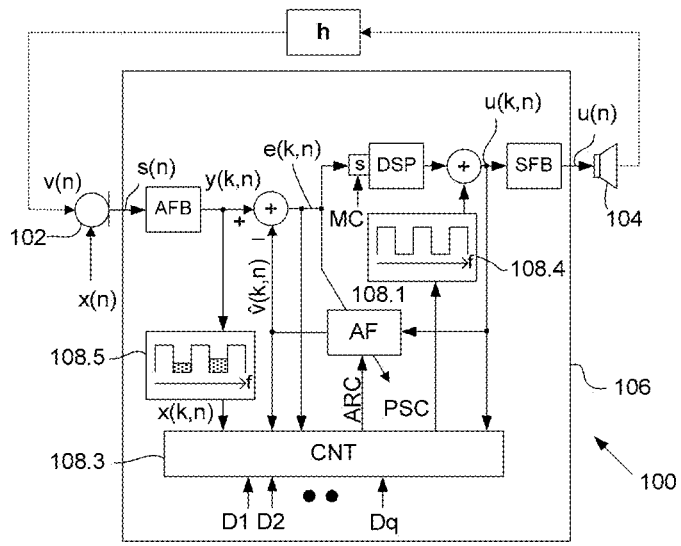
Figure 7B:
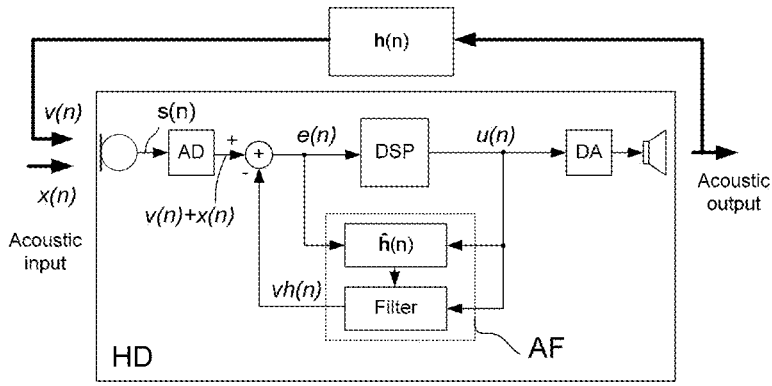
Figure 7C:
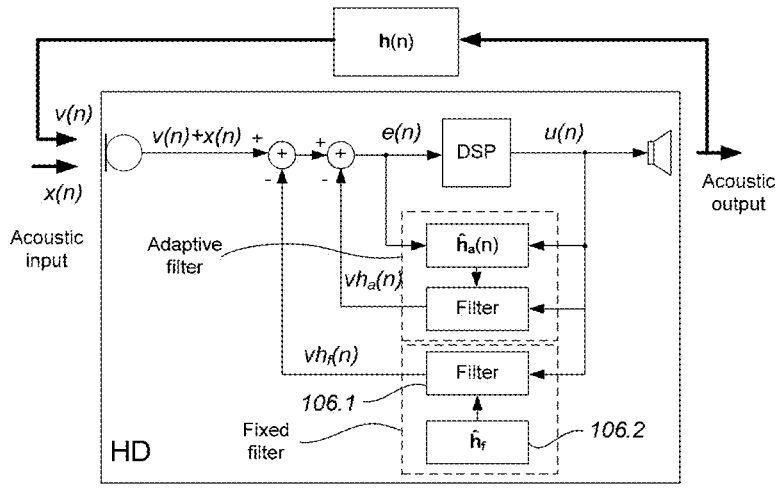

FIG. 5 shows illustrations of alternative acoustic feedback-path estimation signals used by embodiments of a binaural hearing system, FIG. 6A and FIG. 6B show schematic block diagrams of an embodiment of a hearing device coupled to a fitting system and/or to an auxiliary device, e.g. a SmartPhone, and FIG. 7A, FIG. 7B and FIG. 7C show further embodiments of hearing devices according to the present disclosure FIG. 1 shows a schematic block diagram of a hearing device 100 that forms an embodiment of a hearing device according to the present invention.

The hearing device 100 comprises an input transducer 102 in the form of one or more microphones, and an output transducer 104 in the form of a receiver (or one or more receivers/loudspeakers). A signal processor 106 is connected between the input transducer 102 and the output transducer 104. A feedback-path estimation unit 108 is connected (e.g. integrated) with the signal processor 106.

In operation, the input transducer 102 detects and converts any acoustic input signals (sound) to corresponding electric input signals representing the sound received. The output transducer receives 104 an electric output signal from the signal processor 106 and converts it to an acoustic output signal (sound) that is provided to the user's ear.

The signal processor 106 is (in a normal mode of operation) operable for processing an electric input signal provided by the input transducer 102 and, based on this processing, for providing an electric output signal to the output transducer 104. As one part of its processing capability, the signal processor comprises a filter 106.1 implementing an adaptive transfer function. The filter 106.1 transforms the electric input signal and provides a filtered electric output signal in accordance with specific physiological parameters and preferences of the user (e.g. a user's hearing impairment), and typically dependent also on the acoustic environment in which the hearing device is currently operated. The transfer function is in the present example controlled by a set of adaptable filter parameters F1 to Fn stored and maintained dynamically in a memory 106.2 of the signal processor 106. Other filter parameters (not shown) controlling the transfer function may be fixed during normal operation of the listening device. The number n of adaptable filter coefficients depends on the specific adaptive transfer function used. In a variant of this embodiment, the memory is arranged externally with respect to the signal processor 106 and connected electrically with the signal processor 106. The filter coefficients may be represented in the time domain as well as (or alternatively) in the frequency domain.

The feedback-path estimation unit 108 is operable for determining an estimate of an external acoustic feedback path FP from the output transducer 104 to the input transducer 102. An output of the feedback-path estimation unit 108 is used by the filter 106.1 in adapting at least one of the filter parameters F1 to Fn of its adaptive transfer function to correct the received electric input signal from undesired feedback components generated by the external feedback path FP. Alternatively, an output of the feedback-path estimation unit 108 comprising a feedback path estimate may be combined with (e.g. subtracted from) the electric input signal(s) from the input transducer in appropriate combination units (e.g. sum-unit(s)), cf. e.g. FIG. 6, 7.

The feedback-path estimation unit 108 comprises an adaptive feedback-path estimator 108.1 that is configured to perform an adaptive feedback-path estimation algorithm. The adaptation process of the feedback-path estimation algorithm is controllable by an adaptation-step size parameter S that influences the convergence (or divergence) speed of the feedback-path estimation algorithm. The adaptation-step size parameter S thus forms an input parameter used by the adaptive feedback-path estimator 108.1 and is stored and maintained dynamically in a memory 108.2 of the feedback-path estimation unit 108. In a variant, the memory 108.2 is arranged externally with respect to the feedback-path estimation unit 108 and connected electrically with it.

In an embodiment, the adaptive feedback estimation algorithm is $$\hat{h}(n+1)=\hat{h}(n)+S(n)u(n)e(n)$$

where $\hat{h}$ is the estimated impulse response of the feedback path h, S is the adaptation parameter, u the output (reference) signal and e the error signal of the forward path, and n a time instance (cf. FIGS. 6A, 7). In an embodiment, the adaptive feedback estimation algorithm is an LMS algorithm. The frequency dependence (f or frequency index k) of each of the elements of the above equation is implicit.

A control unit 108.3 is provided for controlling the operation of the feedback-path estimation unit and, in particular, for starting and stopping feedback-path measurements and for setting the adaptation-step size parameter S.

A probe-signal generator 108.4 is connected with the control unit 108.3 and operable for generating and providing, upon triggering by the control unit (in a particular 'basic feedback estimation' mode of operation), an electric estimation-control signal (a probe signal) that controls the output transducer 104 in generating an acoustic feedback-path estimation signal FBE, which may take the form of a single signal or of a signal sequence. The electric estimation-control signal represents an level spectrum of the feedback-path estimation signal FBE to be output by the output transducer. The signal may be generated in a variety of ways, such as direct synthesis or by digital filtering of a white-noise signal. The probe signal generator 108.4 does not necessarily have to be physically located in the hearing device. In an alternative embodiment, the probe signal generator is located elsewhere (e.g. in the auxiliary device, e.g. in a fitting system) and the probe signal is transmitted (e.g. wirelessly) to the hearing device from the auxiliary device.

The control unit 108.3 receives input from a background-noise estimator 108.5 and uses the input for controlling the adaptation-step size S. The background-noise estimator 108.5 is connected with the feedback-path estimator 108.1 and is operable for receiving background-noise data provided from the input transducer 102. Alternatively or additionally, the control unit may be configured to control the level or the duration of the probe signal based on the input from the background-noise estimator.

Figure 2:
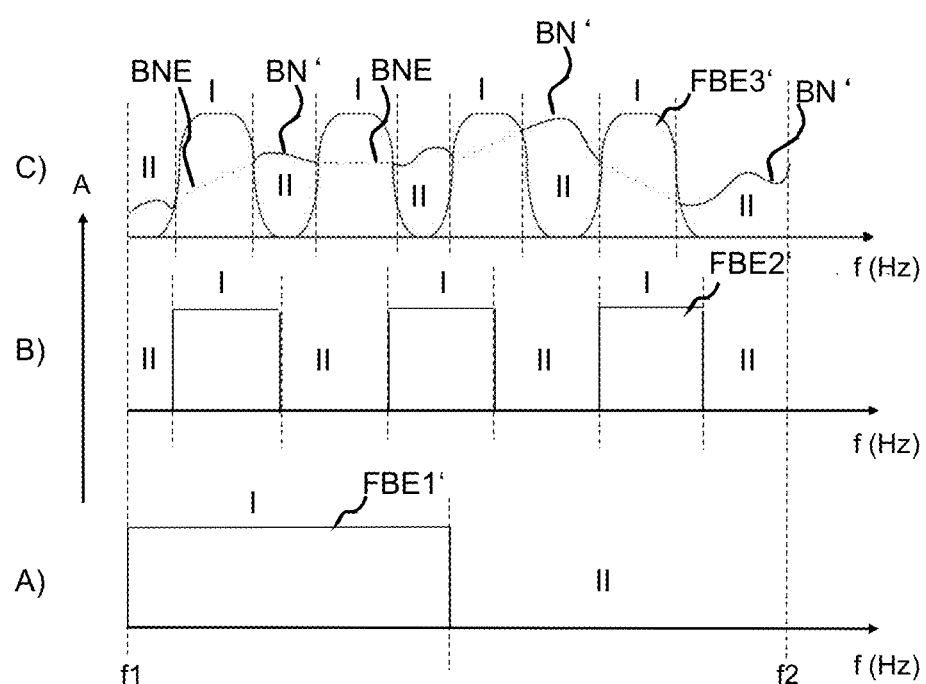
FIG. 2 shows illustrations of alternative acoustic feedback-path estimation signals used in different embodiments of the hearing device.

Operation of the hearing device 100 in performing (e.g. stationary) feedback-path estimation will be explained in the following with reference to FIGS. 1 and 2 in parallel. FIG. 2 shows illustrations of alternative acoustic feedback-path estimation signals used in different embodiments of the hearing device. It is noted that feedback-path cancellation as such is known in the art. The following description therefore focuses on particular features implemented in embodiments of the present invention.

In operation of the feedback-path estimation unit 108, an output of control unit 108.3 triggers a probe signal generator 108.4 to generate an electric estimation-control signal for generating an acoustic feedback-path estimation signal FBE that is provided to the external feedback path FP by the output transducer 104. Parameters determining the spectral configuration of the feedback-path estimation signal FBE are provided by the control unit. They may be pre-selected by proper configuration of the hearing device before starting normal operation. In a variant, the control unit is configured to dynamically determine the spectral configuration of the feedback-path estimation signal. Examples of feedback-path estimation signals are shown in FIG. 2.

In reaction to the provided feedback-estimation signal, the input transducer detects a feedback-estimation signal FBE' that has propagated from the output transducer 104 to the input transducer 102 via the external feedback path FP. An electrical correspondence of the feedback signal FBE' is generated by the input transducer 102 and provided to the adaptive feedback-path estimator 108.1 for estimating the feedback estimation path.

Adaptation of the feedback-path estimation algorithm is controlled by an adaptation-step size parameter S that influences the convergence speed of the algorithm. The adaptation-step size parameter S thus forms an input parameter used by the adaptive feedback-path estimation unit and is stored and adapted in a memory 108.2 of the feedback-path estimation unit 108.

The control unit 108.3 of the feedback-path estimation unit 108 is configured to set the adaptation-step size S of the adaptive feedback-path estimation algorithm in dependence on an estimate of a background-noise spectrum (BN), to which the input transducer (102) is exposed. For determining the adaptation-step size S, the feedback-path estimation unit 108 acquires spectral information on background noise BN, to which the input transducer 102 is exposed and which is detected by the input transducer 102. The adaptation step size S is in one variant a function of the frequency. Also the determination of the adaptation-step size in the process of feedback-path estimation may in this variant be performed in dependence on frequency. In an embodiment, the control unit 108.3 is configured to respectively decrease and increase step size $S(f_x)$ (and thus adaptation rate), if the background-noise level BN (either estimated BNE or measured BN' in FIG. 2C) at frequency $f_x$ (e.g. in a given frequency band) increases and decreases, respectively.

In the hearing device of the present embodiment, a determination of a spectrum of the background-noise is performed using a measurement of a partial background-noise spectrum during the provision of the acoustic feedback-path estimation signal FBE, followed by an estimation of the background-noise spectrum in its remaining unknown parts, which were not covered by the measurement. This particular way of combined feedback-path estimation and background-noise determination is based on generating an acoustic feedback-path estimation signal with a particular level spectrum, as will be explained in the following.

FIG. 2 shows three different detected acoustic feedback-path estimation signals FBE'1 to FBE'3 in three diagrams of FIGS. 2 a) to c). The diagrams of FIG. 2 show the levels of the detected acoustic feedback signal FBE'1 to FBE'3 plotted on the ordinate A as a function of the frequency plotted on the abscissa f. The diagrams are exemplary and schematic and therefore do not contain specific level or frequency scaling on the ordinate and on the abscissa. The detected level spectrum of the feedback-path estimation signals is shown between a lower edge frequency f1 and an upper edge frequency f2 chosen as required for the feedback-path estimation. In an embodiment, only predetermined frequencies are considered where feedback is expected to occur, e.g. based on measurements, e.g. during a fitting process, e.g. frequencies in the range from 1 kHz to 5 kHz.

It shall be assumed that the spectra of the signals FBE'1 to FBE'3 detected by the input transducer 102 as shown correspond to those of respective acoustic feedback-path estimation signals as generated by the output transducer 104. As a common feature, all feedback-path estimation signals FBE'1 to FBE'3 have at least one first frequency band labeled "I" with non-zero level and at least one second frequency band labeled "II" with zero level or with a non-zero level smaller than the level in the first frequency bands and smaller than a detected background-noise BN' level in the respective second frequency band II. Border frequencies between neighboring first and second frequency bands are shown by vertical dashed lines within the respective diagrams. The border frequencies may also be called edge frequencies of the respective neighboring frequency bands. In an embodiment, the feedback path is estimated at a single frequency using a tone. In that case the spectrum of the signal containing the background signal will be broader than the spectrum of the pure tone.

The detected signal BN' of the background-noise level spectrum BN in the second frequency bands is shown by way of example in FIG. 2C). It is shown as detected by the input transducer 102, and is therefore labeled BN' in FIG. 2C). For better legibility of FIG. 2, no background-noise signal is shown in FIGS. 2A) and 2B).

The three examples of acoustic feedback-path estimation signals of FIG. 2 differ in their configuration of first and second frequency bands. In the example of FIG. 2A), there is only one first frequency band I and one second frequency band II, partitioning the covered level spectrum into two frequency bands. In contrast, the feedback-path estimation signal FBE'2 has three first frequency bands I and four second frequency bands II. The levels of the feedback-path estimation signal within the first frequency bands I are constant in these two examples. The transitions between the first frequency band I and the second frequency band II at the edge frequency are vertical, i.e., there is a very narrow transition between the neighboring first and second frequency bands in the acoustic feedback-path estimation signals of the first and second examples. Here, the presence of background noise in the detected signals FBE'1 and FBE'2 is not graphically represented for reasons of simplicity.

The third example of FIG. 2C) shows a somewhat different spectral shape of the detected feedback-path estimation signal FBE'3. While it is generally similar to that of FIG. 2B) in that there is a plurality of first and second frequency bands, four and five in the present example, respectively, the edge regions of the frequency bands are somewhat broader in their transition from the maximum to zero level. This characteristic may partly be due to the presence of background noise in the detected signal FBE3'. However, it is also shown to point out that a narrow, almost vertical transition between the neighboring first and frequency bands is not a requirement. This also relaxes the requirements in the expenditure spent on signal generation, as a generation of sharp transitions with high frequency components is generally more costly (requires longer filters).

The first and second frequency bands of this example of FIG. 2C) typically have time-dependent border frequencies, which slightly vary in their exact frequency value over time, depending on how the level spectrum of the background noise varies in the respective transition range of the acoustic feedback-path estimation signal. As the marking of edge frequencies in FIG. 2C) shows, the level of the feedback-path estimation signal preferably falls below that of the acoustic background noise in the second frequency bands to allow a detection and technical separation of the background-noise spectrum in these frequency bands. This condition defines the edge frequencies between the first and second frequency bands in the present example. In some application cases, known methods to detect a background noise even with lower level than the detected feedback-path estimation signal may be applicable.

The detected feedback-path estimation signals in the first frequency bands are used in the hearing device 100 in the feedback-path estimator 108.1, using processes for feedback-path estimation which per se are known in the art (e.g. an adaptive filter comprising an adaptive algorithm coupled as shown in FIG. 6, 7).

The determination of the background-noise spectrum detected in the second frequency bands is performed by the background-noise estimator 108.5 of the feedback-path estimation unit 108. The background-noise estimator 108.5 receives at least those measured levels of the background-noise spectrum in the second frequency bands II at or near the border frequencies to neighboring first frequency bands I. Preferably, at least one background level estimate is provided within each frequency band. Based on these respective measured background-noise levels, an estimate of the background-noise spectrum in the first frequency bands is estimated using an estimation algorithm. In the illustrative example of FIG. 2C), the background-noise spectrum in the first frequency bands is estimated by a linear mathematical interpolation between levels measured at the lower and upper border frequencies. Level values in the first frequency band are thus calculated in accordance with a linear function. Any other suitable mathematical interpolation technique may be used, such as polynomial interpolation using polynomials of degrees higher than 1, a spline interpolation, a Gaussian interpolation. Alternative techniques of estimation may be used as well for "filling up" the background-noise spectrum in the first frequency bands I. For instance, an estimation may be based on determining a spectral noise pattern based on the ascertained data in the second frequency bands II. In this example, stored background-noise data for the first frequency bands may be accessed and, if necessary, scaled to fit the into a current overall noise level. Other ways of estimation will be discussed below for binaural hearing devices.

The determined and completed background-noise spectrum is used by the control unit 108.3 to set the adaptation-step size S. Depending on the algorithm of feedback-path estimation used by the feedback-path estimator 108.1, the adaptation-step size S is selected for the whole frequency range between f1 and f2, or it is determined to assume different values for different spectral regions of the spectrum. The latter alternative may lead to different speeds of convergence of feedback-path estimation in different spectral regions.

After feedback-path estimation is completed, the results are provided to the filter 106.1, which adapts the filter parameters F1 to Fn based on the estimated feedback path.

This embodiment achieves a particular fast adaptation of the feedback-cancellation by employing a feedback-path estimation that has a particularly low processing time (because the adaptation rate is optimized to the background noise level).

The feedback-path estimation unit 108 of the embodiment forms an integral part of an integrated digital signal processing component that also includes signal processor 106. It may be implemented as a component of integrated circuitry. In another embodiment, it is formed by a programmable processor component that may or may not be implemented in integrated form with the signal processor 106. However, in other embodiments, it forms a separate piece of hardware, for instance a separate chip.

Figure 3:
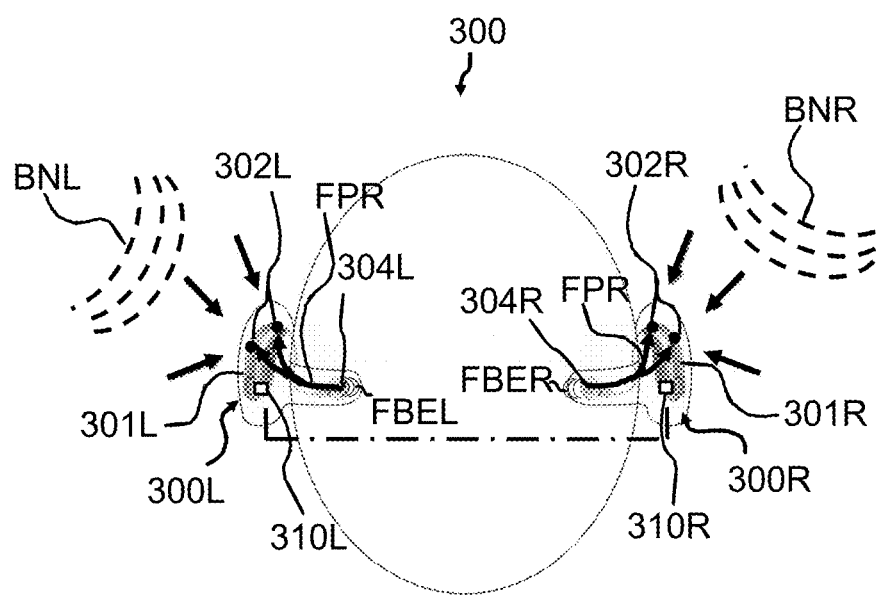
FIG. 3 shows an embodiment of a binaural hearing system formed of two hearing devices according to an embodiment of the present invention.
Figure 4:
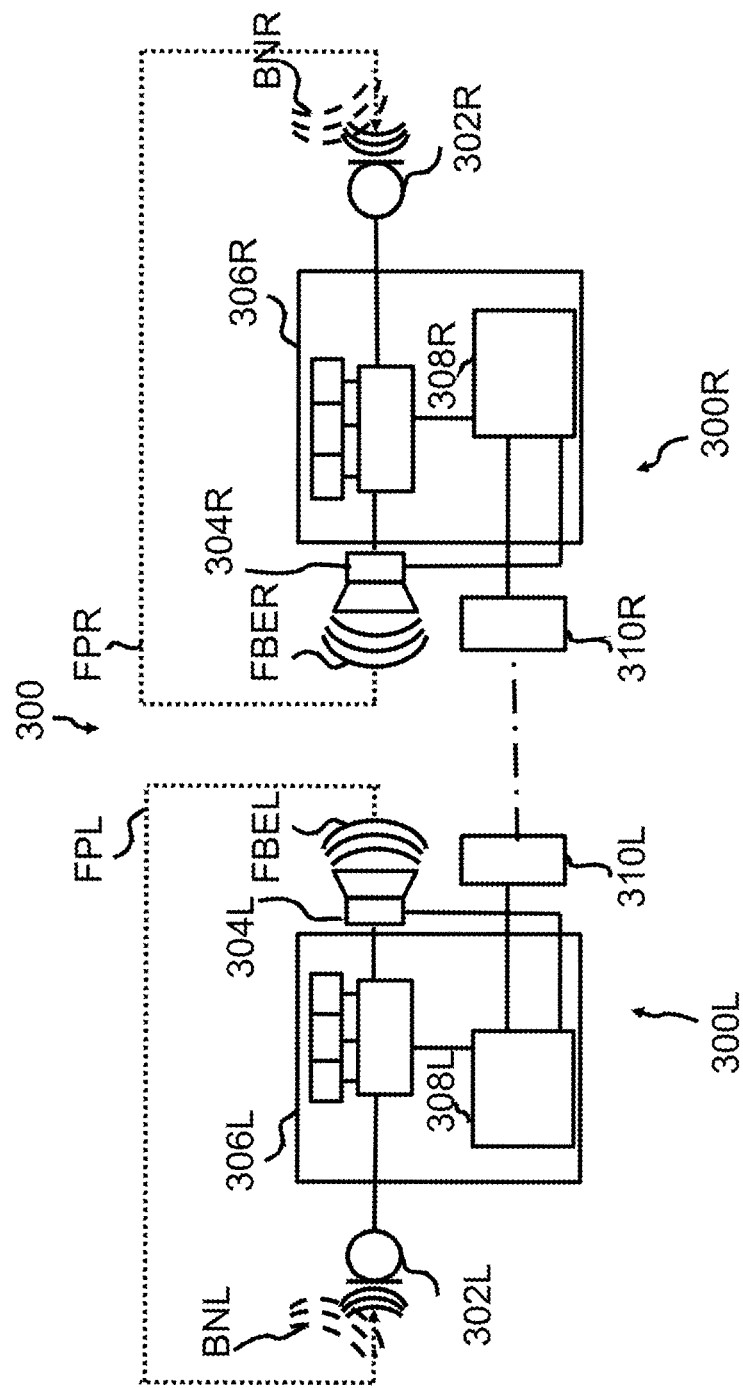
FIG. 4 shows a schematic block diagram of a binaural hearing system in accordance with an embodiment of the present invention.

Next, an embodiment of a binaural hearing system 300 will be described with reference to FIGS. 3 to 5 in parallel. FIG. 3 shows an embodiment of a binaural hearing system formed of two hearing devices according to an embodiment of the present invention. FIG. 4 shows a schematic block diagram of a binaural hearing system in accordance with an embodiment of the present invention. FIG. 5 shows illustrations of alternative acoustic feedback-path estimation signals in the two hearing devices of the hearing device, as used by embodiments of a binaural hearing system.

FIG. 3 shows a schematic illustration of an embodiment of a binaural hearing system 300 formed of two hearing devices 300L and 300R according to an embodiment of the present invention. The binaural hearing system 300 is illustrated as placed in the ears of a user. The hearing device 300L is arranged at and in the left ear of the user, and the hearing device 300R is arranged at and in the right ear of the user. The hearing devices 300L and 300R each have a casing 301L, 301R that accommodates the input transducers 301L, 301R and the signal processing hardware of the forward path, such as the signal processor 106 and the feedback-path estimation unit 108. Furthermore, each hearing device has a pair of input transducers 302L, 302R, and an output transducer 304L, 304R. The detailed structure of the hearing devices 300L, 300R is shown in FIG. 4 and in most parts corresponds to that shown for the embodiment of the hearing device 100 of FIG. 1. However, as shown in FIGS. 3 and 4, both hearing devices additionally comprise a link unit 310L, 310R enabling an exchange of signals and data between the two hearing devices 300L, 300R, as indicated by a dash-dotted line connecting the two link units 310L, 310R. For more structural detail of the feedback-path estimation units 308L, 308R reference is made to the embodiment of FIG. 1.

The communication link between link units 310L and 310R enabling an exchange of control data and possibly audio data between the hearing devices may be wired or preferably wireless. Wireless links may e.g. be inductive links based on utilizing near-field properties of the electromagnetic field (inductive coupling between inductor coils in respective devices). Such links have been widely used in hearing devices due to their relatively low power consumption (and appropriate, short range). Alternatively, wireless links may be based on far-field properties of the electromagnetic field (radiated fields, RF). Increasingly, wireless links involving hearing devices or accessories for hearing devices are based on Bluetooth or other proprietary or standardized, relatively low power (and correspondingly short range, e.g. less than 100 m) technologies (e.g. Bluetooth Low Energy, DECT, Wi-Fi (IEEE 802.11), ZigBee, etc.). In an embodiment, the interaural communication link between the left and right hearing devices 300L, 300R is based on inductive coupling between antenna coils of the link units 310L and 310R. This has the advantage over a corresponding link based on radiated fields that the attenuation of the head is much smaller for the inductive link (which is typically operated at a lower frequency, e.g. less than 100 MHz, than e.g. links based on Bluetooth (2.4 GHz)).

Operation of the hearing devices in the binaural system will be described next. Generally, the operation strongly resembles that of the hearing device 100 of FIG. 1, as explained above with additional reference to FIG. 2. It will be appreciated that the illustrations of FIG. 5 closely resemble those of FIG. 2, and therefore the following description focuses on the differences between the embodiment of the hearing device 100 for operation as a monaural hearing device and the binaural system 300 having two hearing devices designed for operation in such a binaural hearing system.

The feedback-path estimation unit 308L, 308R of FIG. 4 use spectrally complementary acoustic feedback-control signals FBER, FBEL in the process of feedback estimation of the respective external feedback paths FPR and FPL. The feedback-path estimation units 308L, 308R of the two hearing devices 300L, 300R are configurable for setting their respective first and second frequency bands IL, IIL, and IR, IIR in a complementary manner, such that respective first frequency bands IL of the hearing device 308L substantially coincide in frequency with respective second frequency bands IIR of the hearing device 308R (as shown in FIG. 5).

Thus, in the process of feedback-path estimation that is performed by each of the hearing devices 308L, 308R individually, each hearing device measures a different part BNL', BNR' of the background-noise spectra of the background-noise BNL, BNR to which the hearing devices 300L, 300R are exposed. While the spectra may differ, they will typically be similar in the spectral features. The spectral information BNL', BNR' measured is exchanged between the two hearing devices via their link units 310L, 310R and serves as a basis for a respective background-noise estimate BNER, BNEL used by the respective background-noise estimator of the feedback-path estimation units 308L, 308R. This in turn leads to the individual determination of the respective adaptation-step size S in each of the hearing devices 300L, 300R.

It is not a requirement that both devices together cover the full spectrum. In a variant, each of the hearing devices 308L, 308R is configured to operate like the monaural device of FIG. 1 and to employ other techniques of noise estimation described above in case any spectral information on background noise is not provided by the respective other device.

Further, it could be e.g. that interpolation works better at very high frequencies compared to the binaural exchange of background levels (due to a possible head shadow effect). So a combination of the two background level estimates may also be an option.

FIG. 6 relates to a typical scenario where the present disclosure is of particular value, a fitting situation, specifically a situation where a first or basic estimate of a feedback path is to be estimated. FIG. 6A shows a schematic block diagram of an embodiment of a hearing device (HD) 100 according to the present disclosure, and FIG. 6B shows such hearing device 100 (wired or wirelessly) coupled to a fitting system (FIT-SYS) via a programming interface (PROG-IF).

FIG. 6A shows a schematic block diagram of an embodiment of a hearing device 100 according to the present disclosure. Signals are generally time variant. This is indicated in FIG. 6A (and FIG. 7) by time index n. In parts of the block diagrams, signals are resolved in a time-frequency representation as indicated by time and frequency indices n, k. The hearing device comprises an input transducer 102 (here a microphone) for converting an input sound to an electric input signal s(n), an output transducer 104 (here a loudspeaker) for converting an electric output signal u(n) to an output sound, and a signal processor 106 configured to analyze the electric input signal s(n) and to generate the electric output signal u(n). In FIG. 6A, however, an example of the coupling of the feedback estimation unit 108.1 and filter 106.1 (106.2) comprising an adaptive algorithm ĥ for estimating the feedback path h from output transducer 104 to input transducer 102 and the probe signal generator 108.4 are further described. During a feedback measurement (e.g. in a specific basic feedback measurement mode of operation, e.g. during fitting), a probe signal generator 108.4 generating probe signal u(k,n) and having a frequency spectrum as schematically indicated in FIG. 2 is coupled to the output transducer 104 via synthesis filterbank (SFB) providing time domain output signal u(n), thereby generating a corresponding output sound (FBE in FIG. 1, e.g.). The feedback path (h) provides feedback signal v(n) at the input transducer 102, where additionally external (noise) signal x(n) is present. The mixed feedback and background noise sound signal (v(n)+x(n)) is picked up by the input transducer 102 and 'delivered' as electric input signal s(n). Input transducer 102 is coupled to analysis filterbank (AFB), which provides time domain input signal s(n) in a time-frequency representation, e.g. in a number of frequency bands, in the form of signal y(k,n). An adaptive filter unit (AF), including the feedback estimation unit (($\hat{h}$) 108.1), is coupled to a combination unit (here sum unit '+') and to the output of the probe signal generator 108.4. The adaptive filter unit (AF) provides (in an open loop measurement) an estimate of the feedback path in the form of signal $\widehat{v(k,n)}$. The feedback path estimate $\widehat{v(k,n)}$ is subtracted from input signal y(k,n) in sum unit (+), and the resulting (error) signal e(k,n) is used as input to the adaptive algorithm (feedback estimation unit (108.1)) of the adaptive filter unit (AF) (together with (reference) signal u(k,n)), see also FIG. 7B, 7C. The adaptive filter unit filters output signal u(k,n) using filter coefficients as determined by the adaptive algorithm (e.g. an LMS or any other suitable algorithm, e.g. by minimizing a statistical deviation measure of the error signal e(k,n) (e.g. $\epsilon[|e(k,n)|^2]$, where $\epsilon$ is the expected value operator) and provides feedback estimate signal $\widehat{v(k,n)}$. Electric input signal y(k,n) is analyzed by back-ground noise estimator 108.5, which analyses the spectral contents of the frequency bands corresponding to the low level frequency bands (second frequency bands) of the probe signal u(k,n), and estimates a level of noise in the other (complementary, first) frequency bands. Back-ground noise estimator 108.5 provides signal x(n,k) containing estimates of noise levels (BN', BNE in FIG. 2C) in the frequency bands of the input signal to control unit (CNT) 108.3. Based thereon (e.g. on a noise level and/or on a change over time of a noise level (time derivative) in each (first and second) frequency band, the control unit 108.3 determines an appropriate adaptation rate (e.g. step size) of the adaptive algorithm via signal ARC. Further, the control unit CNT is configured to control the mode selection of the hearing device, including the onset and termination of the feedback measurement (including the application and termination of the probe signal u(k,n) via signal PSC). Preferably, the hearing device 100 (e.g. operatively coupled to the control unit 108.3) comprises an interface (PROG-IF) to a programming device (FIT-SYS) allowing a remote control of the feedback measurement (see FIG. 6B).

FIG. 6B shows a schematic block diagram of an embodiment of a hearing device 100 (HD, e.g. as shown in FIG. 6A) coupled to a fitting system (FIT-SYS) via a communication link (FL) and a programming interface (PROG-IF) of the hearing device. The signal processor (SP) of the hearing device is operationally connected to the fitting system via signal FC-FD allowing control signals to be generated via the fitting system and executed in the hearing device and the exchange of data between the fitting system and the hearing device. Preferably, the mode of operation of the hearing device can be controlled via the fitting system (e.g. by an audiologist). Preferably the conduction of a feedback path estimation can be initiated and/or post processed in the fitting system (e.g. to modify parameters of a processing algorithm based on the feedback measurement). The fitting system (FIT-SYS) is e.g. in general configured to customize signal processing algorithms of the hearing devices to a particular user's needs, e.g. to provide that the hearing device is adapted (e.g. programmed) to compensate for the user's hearing impairment and/or to otherwise adapt the hearing device to the user's wishes or needs (e.g. to activate or deactivate certain features of the hearing aid). Further, the fitting system may be configured to allow certain measurements to be carried out in cooperation with functional elements of the hearing device (e.g. the feedback measurement as described in the present disclosure).

During a feedback measurement, the hearing device(s) may, as described above, be connected to a fitting computer by a wired or wireless link (FL). Actual calculation of the feedback path does therefore not necessarily have to take place in the hearing device (HD). In an embodiment, the feedback estimate is performed in the computer running the fitting software (e.g. a PC or dedicated programming device) or in an auxiliary device (e.g. a SmartPhone), which may be (e.g. wirelessly) connected to the hearing device(s). Hence, the feedback estimation unit may alternatively be located in the fitting system (or in auxiliary device).

In an embodiment, the background level is estimated (or partially estimated) at a microphone in an auxiliary device (AD), e.g. a SmartPhone, and forwarded to the hearing device (and/or to the fitting system), e.g. via a wireless link (WL), e.g. a Bluetooth link (or a link specifically adapted to consume low power, e.g. a link based on Bluetooth Low Energy). This is illustrated in the lower right part of FIG. 6B, where the auxiliary device (AD) runs an APP to estimate a current noise spectrum in the neighbourhood of the hearing device (e.g. using a microphone of the auxiliary device (or receiving a microphone signal from the hearing device), e.g. a remote control device, e.g. a SmartPhone) and communicating the result to the hearing device 100 (as shown here via link WL), or to the fitting system FIT-SYS, via a communication interface (e.g. via the hearing device, or directly). In an embodiment, a mode of operation of the hearing device may be initiated from a user interface, e.g. comprising an activation element on the hearing device, or from (e.g. an APP of) the auxiliary device. In an embodiment, the feedback measurement may be initiated from (e.g. an APP of) the auxiliary device.

Also, if the whole sequence of recorded signals received at a microphone as a consequence of the issued probe signal are available at the computer of the fitting system or at a SmartPhone, the feedback path estimation does not necessarily have to be adaptive.

FIG. 7A shows a schematic block diagram of an embodiment of a hearing device 100 according to the present disclosure. The embodiment of FIG. 7A comprises the same functional blocks as illustrated in and discussed in connection with FIG. 6A. Additionally, the control unit 108.3 (CNT) receives a number of inputs (D1, D2, ..., Dq) to aid in the control of the mode of operation and the feedback path measurement, e.g. from a number of detectors, e.g. noise estimates from a noise detector, a tone detector, a voice detector, etc. The inputs may be received from other devices (e.g. from another hearing device of a binaural hearing system) or from the hearing device 100 itself. Further, the control unit 108.3 of FIG. 7A receives the input (error) signal and the output (e.g. probe) signal. In an embodiment, the control unit is configured to estimate an autocorrelation of a signal of the forward path or a cross-correlation between two signals of the forward path (e.g. e and u) and to use such parameters in the determination of the adaptation rate of the adaptive algorithm. FIG. 7A is intended to illustrate an embodiment of a hearing device 100 that is configured to estimate a feedback path in a 'basic feedback path estimation mode of operation' of the hearing device, where switch (s) in the forward path at the input of the signal processing unit (DSP) is open (as controlled by mode control input MC, e.g. from control unit 108.3). The hearing device is further configured to operate in a normal mode, where switch (s) is closed and where the probe signal generator is inactive (or in another mode of operation, e.g. providing a specific probe signal for normal use). In the normal mode, the hearing device is assumed to be used in a closed loop configuration, where the input signal s(n) is adaptively corrected for feedback by subtracting the feedback estimate provided by the adaptive filter AF, and the resulting feedback corrected (error) signal e is enhanced by the signal processing unit DSP (e.g. by providing a user specific frequency dependent gain and/or other signal processing to the input signal) and providing processed output sign u that may or may not be mixed with a probe signal from probe signal generator 108.4 via mixing unit (here sum uni '+') before being fed to (synthesis filterbank SFB and) output transducer 104 and presented to the user as an output sound (or vibration). The normal mode of operation of the hearing device is further described in connection with FIGS. 7B and 7C.

The signal of the forward path is shown to be processed in a time-frequency representation, but may alternatively be operated in the time domain. Other switch units than the one shown may be included and controlled by the control unit to allow a selective switching in and out of functional blocks according to the current mode of operation, e.g. to switch in and out the noise estimation unit 108.5 or the adaptive filter AF (e.g. in a mode where no feedback cancellation is intended), to thereby optimize current consumption. Typically, the hearing device comprises an energy source (e.g. a battery) of limited capacity.

FIG. 7B shows an embodiment of a hearing device (HD) in a normal mode of operation, where an adaptive filter (AF) estimates the feedback path and a combination unit ('+') subtracts the feedback path estimate $\widehat{v(n)}$ (vh(n)) from the digitized input signal s(n)=v(n)+x(n) (x(n) being the target (environment signal) before the resulting signal e(n) is being processed in the signal processing unit DSP, as described above. The adaptive filter comprises a variable 'Filter' part end a prediction error or algorithm part ($\widehat{(h(n))}$) aimed at providing a good estimate of the 'external' feedback path 'h(n)' from the digital-to-analogue (DA) converter to the output transducer, via feedback path h(n) to the input transducer and analogue-to-digital (AD) converter. The prediction error algorithm (of block $\widehat{(h(n))}$) uses a reference signal (here the output signal u(n)) together with a signal originating from the microphone signal (here error signal e(n)) to find the setting of the adaptive filter (Filter) that minimizes the prediction error when the reference signal is applied to the adaptive filter (AF).

FIG. 7C shows an embodiment of a hearing device (HD) in a normal mode of operation. The hearing device comprise two parallel feedback cancellation systems. The first feedback cancellation system comprises a Fixed filter, comprising a filter part (Filter) provided with filter coefficients as determined by feedback estimation unit 106.2 ($\widehat{h_f}$) according to the present disclosure (e.g. as stored in memory 106.2 of FIG. 1). This feedback estimate $vh_f(n)$ is assumed to represent an estimate of a relatively stationary part of the feedback path h(n) and is subtracted from the input signal v(n)+x(n) comprising a mixture of the present (dynamic) feedback path signal v(n) and an environment (target) signal x(n). The second feedback cancellation system comprises an Adaptive filter, comprising a variable filter part (Filter) adaptively provided with filter coefficients as determined by an adaptive algorithm ($\widehat{h_a(n)}$). This feedback estimate $vh_a(n)$ is assumed to represent an estimate of a relatively dynamic part of the feedback path h(n) and is subtracted from the input signal v(n)+x(n) corrected by the relatively stationary feedback estimate $vh_f(n)$ to thereby provide an estimate of the environment (target) signal x(n).

For the purpose of legibility of the present description, the focus was on the functionality performed by the feedback-path estimation unit 108 in the context of implementing the present invention. However, the feedback-path estimation unit is in some embodiments not the only control instance controlling adaptable filter coefficients. Other control units may be present and functional in controlling other adaptable coefficients determining the operation of the filter or another.

The invention can also be implemented in other hearing devices, such as earphones, headphones, telephone headsets or mobile telephones.

REFERENCE SIGNS

100 hearing device
102 input transducer
104 output transducer
106 signal processor
106.1 filter
106.2 memory of the signal processor
108 feedback-path estimation unit
108.1 feedback-path estimator
108.2 memory of the feedback-path estimation unit
108.3 control unit of the feedback-path estimation unit
108.4 probe-signal generator
108.5 background-noise estimator
300 binaural hearing system
300L hearing device for left ear
300R hearing device for right ear
301L, 301R casings
302L, 302R input transducers
304L, 304R output transducers
308L, 308R feedback-path estimation units
310L, 310R link units
A level (ordinate)
f frequency (abscissa)
BN background-noise
BN' detected background-noise
n maximum index number
F1 to Fn set of adaptable filter parameters
FBE acoustic feedback-path estimation signal
FBE' detected feedback-estimation signal
FBE'1 detected feedback-path estimation signal
FBE'2 detected feedback-path estimation signal
FBE'3 detected feedback-path estimation signal
f1 lower edge frequency
f2 upper edge frequency
FP external acoustic feedback path
S adaptation-step size
"I" first frequency band
"II" second frequency band

The invention claimed is:

1. A hearing device adapted for being located in or at an ear of a user and comprising
an input transducer, which is configured to detect and convert an acoustic input signal to an electric input signal;
an output transducer, which is configured to receive and convert an electric output signal to an acoustic or vibrational output signal;
a feedback-path estimation unit, which is configured to estimate a feedback path from the output transducer to the input transducer by performing an adaptive feedback-path estimation algorithm and to set an adaptation rate parameter of the adaptive feedback-path estimation algorithm in dependence on an estimate of a background-noise spectrum, to which the input transducer is exposed; wherein the feedback-path estimation unit is further configured to provide to the output transducer an electric estimation-control signal for generating an acoustic feedback-path estimation signal having an level spectrum, which has at least one first frequency band with non-zero level and at least one second frequency band with zero level or with a non-zero level smaller than the level in the first frequency band and smaller than a background-noise level in the respective second frequency band;

to control the input transducer to detect background noise in the at least one second frequency band while the feedback-path estimation signal is provided; and to estimate a background-noise level in the at least one first frequency band for obtaining the estimate of the background-noise spectrum.

2. The hearing device of claim 1, wherein the estimate of the background-noise level in the at least one first frequency band is based on the detected background-noise level in the at least one second frequency band.

3. The hearing device of claim 1, wherein the feedback-path estimation unit is configured to estimate the background-noise level in the at least one first frequency band using an level of the background noise detected in the at least one respective second frequency band immediately adjacent to the respective first frequency band.

4. The hearing device of claim 1, further comprising a link unit, which is configured to exchange, in a binaural operation mode of the hearing device, signals with an external link unit of a second hearing device that together with the hearing device forms a binaural hearing system, wherein the link unit is configured to receive from the external link unit and provide to the feedback-path estimation unit noise-estimation signals representing background-noise levels in at least one of the first frequency bands, and wherein the feedback-path estimation unit is configured to estimate the background-noise levels in the corresponding at least one of the first frequency bands using the received noise-estimation signals.

5. A binaural hearing system, comprising two hearing devices in accordance with claim 4, wherein the feedback-path estimation units of the two hearing devices are configurable for setting their respective first and second frequency bands in a complementary manner, such that respective first frequency bands of a first one of the two hearing devices coincide in frequency with respective second frequency bands of the second one of the two hearing devices.

6. A hearing system comprising a binaural hearing system according to claim 5 and an auxiliary device, the hearing system being configured to allow exchange of data between the binaural hearing system and the auxiliary device.

7. The hearing device of claim 1, wherein the at least one second frequency band is arranged between two adjacent first frequency bands.

8. The hearing device of claim 1, wherein the level spectrum of the acoustic feedback-path estimation signal comprises an alternating sequence of first and second frequency bands.

9. The hearing device of claim 1, further comprising a signal processor, which is connected with the feedback-estimation unit, the input transducer and the output transducer and which is configured to apply an adaptable transfer function to the electric input signal or a signal derived therefrom and to provide a filtered electric output signal, the adaptable transfer function being controlled by adaptable filter coefficients determined using feedback-path estimation information provided by the feedback-path estimation unit.

10. The hearing device of claim 1, wherein the feedback-path estimation unit comprises a feedback-path estimator, which is configured to perform an adaptive feedback-path estimation algorithm, whose convergence speed is controlled using a controllable value of an adaptation-step size parameter, a control unit, which is configured to start a feedback-estimation operation and to set the adaptable step-size parameter in dependence on the estimate of a background-noise spectrum, a probe-signal generator, which is configured to generate and provide to the output transducer an electric estimation-control signal having a spectral configuration defining the first and second frequency bands of the acoustic feedback-path estimation signal to be generated by the output transducer;

a background-noise estimator, which is configured to receive from the input transducer measured background-noise spectrum information regarding the second frequency bands and to estimate background-noise spectrum information regarding the first frequency bands.

11. The hearing device of claim 1, wherein the feedback-path estimation unit is configured to provide at its output, at a given moment in time, either the estimation-control signal or an alternative estimation-control signal having an level spectrum differing from that of the estimation-control signal, and to refrain from estimating the background-noise spectrum when the alternative feedback-path estimation signal is provided.

12. The hearing device of claim 1 comprising a communication interface to a fitting system allowing to control the hearing device from the fitting system and/or to exchange data between the hearing device and the fitting system.

13. The hearing device of claim 1 wherein the hearing device is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears.

14. A hearing system comprising a hearing device according to claim 1 and an auxiliary device, the hearing system being configured to allow exchange of data between the hearing device and the auxiliary device.

15. A method for operating a hearing device adapted for being located in or at an ear of a user in estimating a feedback path between an input transducer, which converts an input sound to an electric input signal, and an output transducer, which converts an electric output signal to an output sound, the method comprising:

providing, via the output transducer, an acoustic feedback-path estimation signal having an level spectrum exhibiting at least one first frequency band having non-zero level and at least one second frequency band, which has zero level or a non-zero level smaller than the level in the first frequency band and smaller than a background-noise level in the respective second frequency band;

estimating the feedback path from the output transducer to the input transducer by performing an adaptive feedback-path estimation algorithm;

detecting background noise in the at least one second frequency band while the acoustic feedback-path estimation signal is provided;

estimating a background-noise level in the at least one first frequency band for obtaining an estimate of a background-noise spectrum to which the input transducer is exposed; and setting an adaptation rate parameter of the adaptive feedback-path estimation algorithm in dependence on the obtained estimate of the background-noise spectrum.

16. The method of claim 15, further comprising estimating a background-noise level in the at least one first frequency band based on the detected background-noise level in the at least one second frequency band and/or on an estimated background-noise level in the at least one first frequency band.

17. The method of claim 15, further comprising
estimating the background-noise level in at least one of the first frequency bands using an level of the background noise detected in at least one respective second frequency band immediately adjacent to the respective first frequency band.

18. The method of claim 15, further comprising,
operating the hearing device in a binaural operation mode, and, while operating in the binaural operation mode:

exchanging signals with an external second hearing device that together with the hearing device forms a binaural hearing system, receiving from the second hearing device noise-estimation signals representing background-noise levels in the at least one first frequency band, and estimating the background-noise levels in the corresponding at least one first frequency band using the received noise-estimation signals.

19. A method for operating a binaural hearing system of two hearing devices, the method comprising each of the two hearing devices performing a method according to claim 18;

wherein the respective first and second frequency bands are set by the two hearing devices in a complementary manner, such that respective first frequency bands of a first one of the two hearing devices coincide in frequency with respective second frequency bands of the second one of the two hearing devices.

* * * * *